United States Patent

[11] 3,626,267

[72] Inventor John T. Bobbitt
 Houston, Tex.
[21] Appl. No. 87,390
[22] Filed Nov. 6, 1970
[45] Patented Dec. 7, 1971
[73] Assignee Mandrel Industries, Inc.
 Houston, Tex.

[54] DIGITAL PHASE-CORRECTING SERVO FOR CONTROLLING THE PHASE OF AN ANALOG DRIVE SIGNAL
 9 Claims, 6 Drawing Figs.

[52] U.S. Cl.......................................................... 318/686,
 318/603, 318/686
[51] Int. Cl........................................................G05b 19/28
[50] Field of Search............................................ 318/686,
 608, 603, 601, 604

[56] References Cited
 UNITED STATES PATENTS
 3,439,336 4/1969 Toifl et al. ..................... 318/603
 3,564,379 2/1971 Bakel et al. .................... 318/608
 3,548,282 12/1970 Schiller ........................ 318/608 X

*Primary Examiner*—Benjamin Dobeck
*Attorney*—Robert G. Clay

ABSTRACT: An analog drive signal for driving a vibrator, motor, or like driven apparatus, is converted to a digital signal and is delayed in a digital buffer memory. The memory is unloaded at two separate discrete times and the resulting digital signals are converted to provide an analog reference signal and an analog drive signal. The reference signal is unloaded at a constant rate relative to the input load rate but is displaced in time by a selected number of total memory locations. The drive signal is unloaded at a programmable rate. The phase relation, i.e., error signal, and signals indicative of the lead or lag of the error signal relative to the reference signal, are sensed and any phase difference detected is counted in units of sample rate time and stored. Associated digital control logic is programmed to cause the drive signal to move the detected number of samples in the memory, in the commensurate direction, to correct the phase of the driven apparatus output, i.e., to provide a zero phase difference relative to the phase of the reference signal. The servo may be preset for minimum initial phase shift by noting the maximum error at the beginning of a test sweep, and by presetting the system correspondingly to start it in phase.

INVENTOR.
JOHN T. BOBBITT

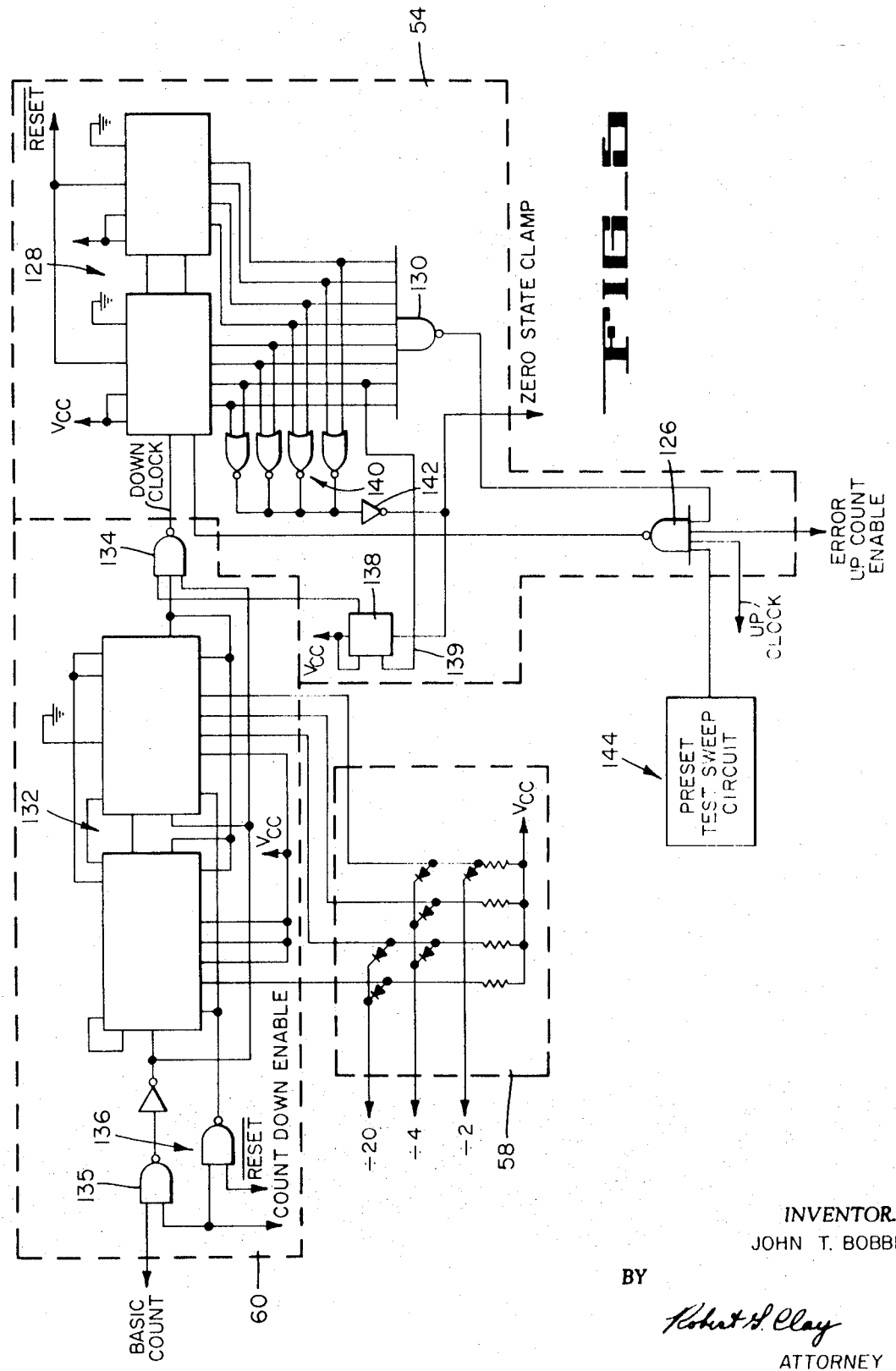

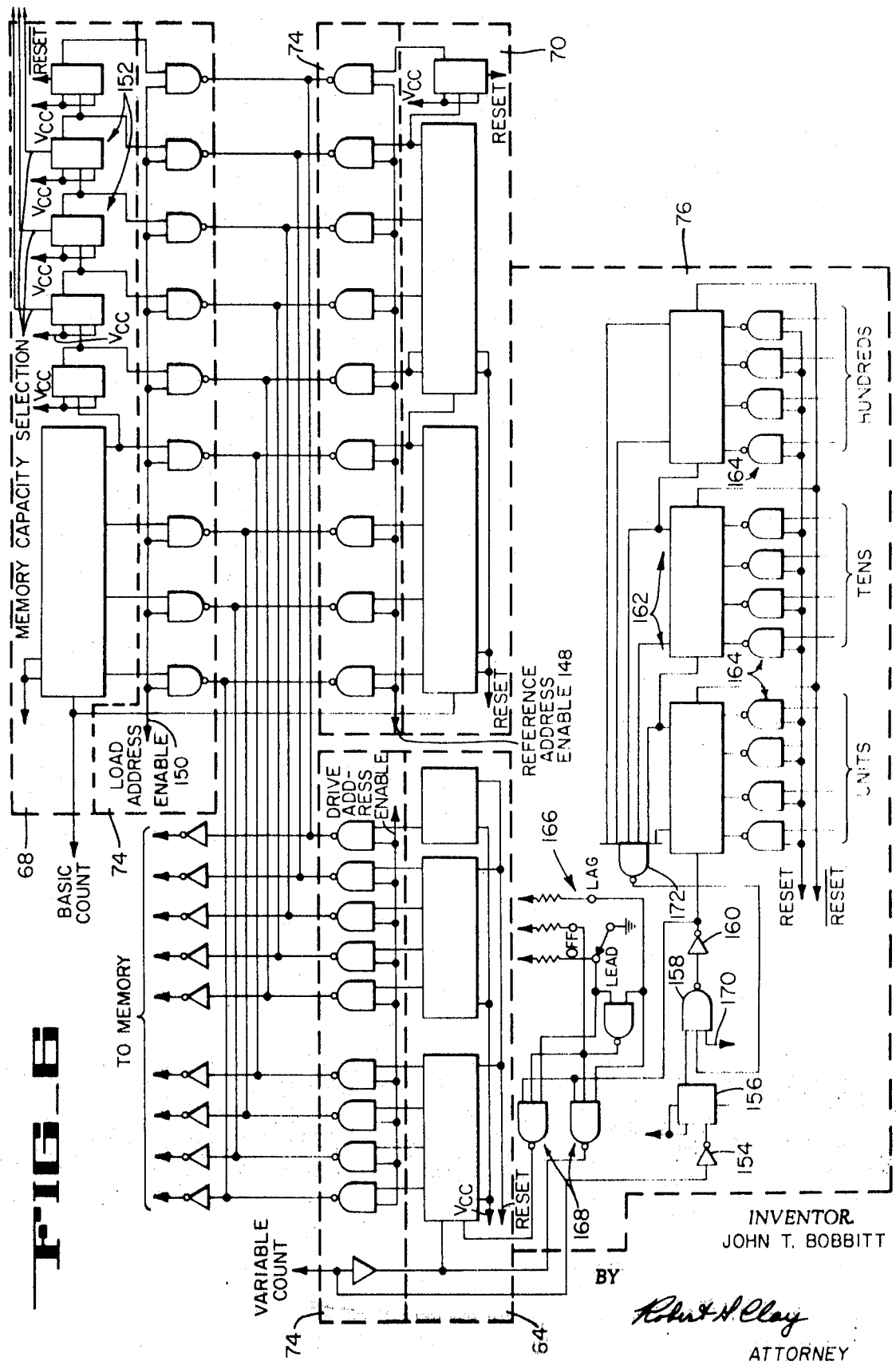

DIGITAL PHASE-CORRECTING SERVO FOR CONTROLLING THE PHASE OF AN ANALOG DRIVE SIGNAL

BACKGROUND OF THE INVENTION

1. Field

The invention relates to a circuit for automatically controlling the phase of a driven apparatus such as, for example, a hydraulic vibrator, to within a selected number of degrees and with a correction rate limited only by the vibrator response time. Although particularly described with respect to a hydraulic vibrator for generating seismic signals, it is understood that the invention may be utilized for correcting the phase of any analog drive signal for use with a variety of driven apparatus.

2. Prior Art

Previous systems for controlling vibrators such as the hydraulically actuated vibrators employed in the generation of seismic signals, provide analog phase control requiring three to five cycles of signal time to develop control sense. Such analog systems further provide very poor phase lock at low frequencies, and poor recovery of control upon the occurrence of transient interruptions.

Further, analog control systems inherently provide overcorrection of an error in phase in an output signal, since the analog control system itself is a reactive component much in the same manner as the driven apparatus. This overcorrection tends to cause oscillation, i.e., "hunting." In fact, various analog control systems provide slower compensation than the driven apparatus itself. In addition, analog control systems can only provide control of the driven apparatus during the presence of the error signal, and cannot provide control at such time as the error is no longer available.

SUMMARY OF THE INVENTION

The present invention provides a digital phase correcting servo which utilizes a digital memory to provide phase correction for an analog drive signal. Unlike analog servos, the invention digital servo experiences no overcorrection effects at the memory since the latter is not a reactive component.

To this end, the analog drive signal (sweep signal as utilized herein by way of example only) is converted to a digital signal, which in turn is stored in a digital buffer memory with a minimum capacity large enough to store one cycle at the lowest frequency of concern (5 hertz in this example). The memory is unloaded at two separate discrete times and the resulting signals are converted back to two separate analog signals. One signal is unloaded at a constant rate relative to the input load rate, but displaced in time by one-half of the total memory locations. This signal is used as a reference signal. The other signal is unloaded at a programmable rate and is used to drive the driven apparatus.

The output of the driven apparatus (e.g. vibrator) is sampled and is compared to the reference signal to determine the phase relationship and any time difference detected is counted in units of sample rate time. Lead or lag in the phase of the vibrator output relative to the reference signal is also sensed and digital control logic is programmed to cause the drive signal to be moved the detected number of samples in the memory in the proper direction, to correct the operation of the driven apparatus such that its output has a zero phase difference relative to the reference signal to which it is being compared.

The phase error between the driven apparatus signal and the reference signal is sensed by a phase detector means, which delivers a signal indicative of the error to a level detector means. The level generated by the level detector means determines the output of a program matrix means. The latter means in turn determines the counting rate of an associated variable sample rate counter and associated logic means, i.e., determines the rate of correction of any phase error in the drive signal. A lead/lag signal is also provided by the phase detector means which determines whether the variable sample rate counter speeds up or slows down. The counter and associated logic means controls the digital memory to move the drive signal the detected number of samples to correct the output of the driven apparatus and thus provide a zero phase difference between it and the reference signal.

The phase detector means inherently provides a phase error signal only at the crossover points. Accordingly an error count and register means is provided to count the error in units of memory samples, and to store the information. Correction of phase error is then made via the phase detector means, the level detector means, the program matrix means, the variable sample rate counter and associated logic means, over the entire interval rather than only during the presence of the error signal.

BRIEF DESCRIPTION OF THE DRAWINGS

FIG. 3, 4, 5 and 6 are schematic diagrams of the various logic circuits shown in block form in FIG. 2, illustrating in further detail logic which may be utilized in accordance with the invention.

DESCRIPTION OF THE PREFERRED EMBODIMENTS

Figure 1:
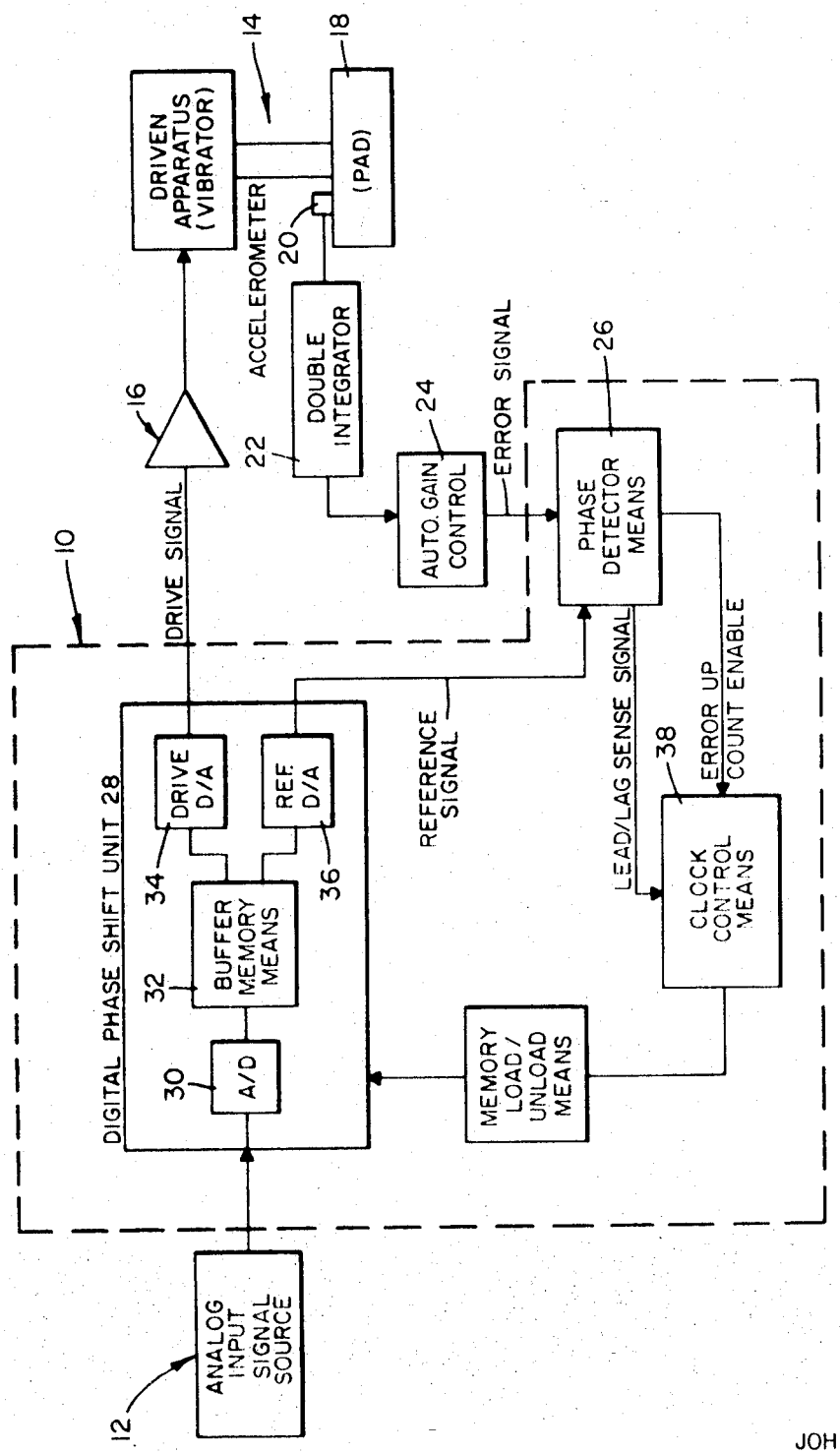
FIG. 1 is a simplified block diagram of the invention digital servo as employed in a seismic vibrator system.

Referring to FIG. 1, there is shown a digital phase correcting servo 10 in accordance with the invention, as employed to control and correct the phase of an analog drive signal initially generated as an analog input signal by an analog signal source 12. The drive signal from the digital phase correcting servo 10 is fed to a driven apparatus 14 via a drive amplifier 16. For simplicity of presentation the driven apparatus 14 is herein depicted as a hydraulically actuated vibrator, conventionally utilized for generating seismic signals in geophysical exploration processes. The output of a vibrator (or driven apparatus) varies in phase, relative to its input, with frequency, and thus the invention contemplates digital means for maintaining a constantly phased output with changing frequency by comparing the output to a reference and shifting the phase of the input the proper amount to correct the phase error. The vibrator 14 employs a pad 18 which is securely coupled to the ground to provide efficient coupling of the generated energy from the vibrator to the ground. An accelerometer 20 is secured to the pad and provides means for generating a signal indicative of the movement of the pad 18 and thus of the analog signal generated. The signal from the accelerometer 20 is introduced to a double integrator circuit 22, which converts acceleration to amplitude and provides an output representative of the displacement of the pad 18. The displacement signal is fed into an automatic gain control means 24 which provides an "error" signal having essentially a constant amplitude, and which contains any phase errors in the vibrator output. The signal from the automatic gain control means 24 is commonly termed an error signal, although it is actually the output of the vibrator in terms of displacement thereof.

The error signal containing any phase errors of the vibrator 14 output relative to the analog input signal delivered by the source 12, is introduced to the analog phase correcting servo 10 and particularly to phase detector means 26 thereof. The analog input signal from the source 12 is delivered to a digital phase shift unit 28 of the servo 10, and more particularly to an analog to digital (A/D) converter 30. The analog input signal delivered by source 12 is herein termed a "sweep" signal, and is for example a constant amplitude sine wave of linearly varying frequency. The A/D converter 30 is of conventional design and converts the sweep signal to a digital signal for introduction to a digital buffer memory means 32. The digital buffer memory means 32 is hereafter termed a memory means for simplicity, and may be a conventional digital memory such as the Ampex Corporation ASM–4000. The digital signal is thus stored and suitably delayed in the memory means 32, which has a minimum capacity large enough to store one cycle at the lowest frequency of concern. In this particular application by way of example only, the lowest frequency is of the order of 5 hertz. The memory means 32 provides two output signals which are introduced to respective digital-to-analog (D/A) converters 34, 36. The D/A converter 34 provides an analog drive signal to the vibrator 14 via the drive amplifier 16. The reference D/A converter 36 provides an analog reference signal which is unloaded at a constant rate relative to the input load rate to the memory means 32, but which is displaced in time by one-half of the total memory locations (in this particular application). The reference signal thus represents the analog input signal. The reference signal is introduced to the phase detector means 26. The drive signal is unloaded from the memory means 32 at a programmable rate commensurate with the desired rate of phase error correction, as further described below.

The phase detector means 26 compares the phase of the incoming error and reference signals at the signal crossover points, i.e., every 180°, and any time difference detected is reflected as a series of pulses having a width proportional to the magnitude of the phase error. This error signal is fed to a digital clock control means 38. A signal indicative of the lead or lag of the phase of the error signal in relation to the reference signal, is also sensed by the phase detector means 26 and is introduced to the digital clock control means 38. The clock control means 38 provides a programmed output which drives a memory load/unload means 40 associated with the digital phase shift unit 28. The signal from the memory load/unload means 40 is indicative of the rate of correction of the phase error in discrete percent levels, and is thus also proportional to the magnitude of the phase error of the vibrator 14. The signal also reflects the lead or lag of the phase error relative to the reference signal. Accordingly, the drive signal delivered via the drive D/A converter 34 is moved the detected number of samples in the memory means 32, in the direction required to correct the vibrator 14 output in order to provide a zero phase difference between it and the reference signal from the unit 28.

Figure 2:
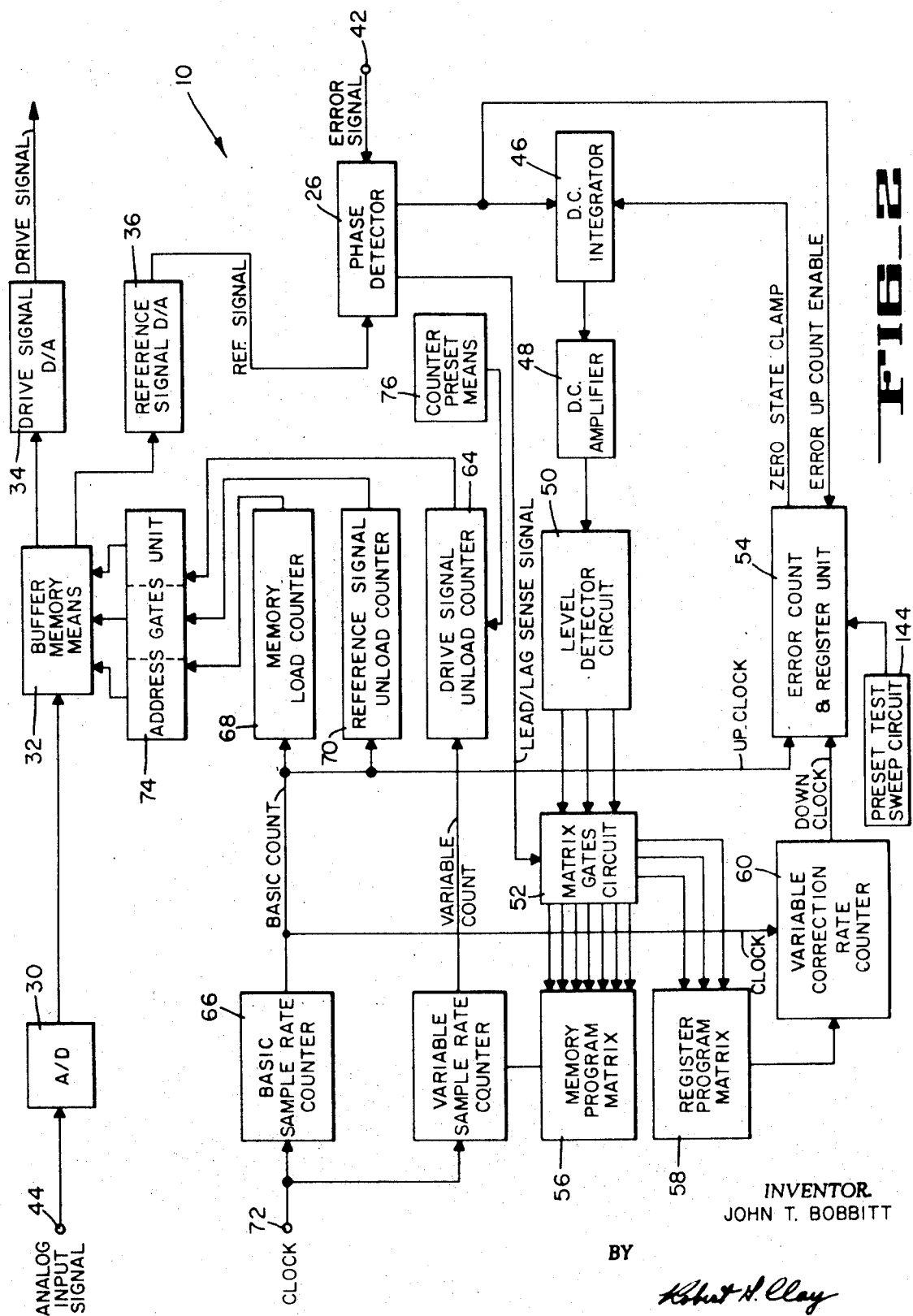
FIG. 2 is a more detailed block diagram of one embodiment of the invention of FIG. 1.

Referring now to FIG. 2 there is shown in greater detail the digital phase correcting servo 10 of the present invention. Similar components in the circuits of FIGS. 1 and 2 are similarly numbered. Accordingly, the error signal which represents the phase errors in the driven apparatus output, is introduced via a terminal 42 to the phase detector 26. Likewise the analog input signal is introduced to the A/D converter 30 via a terminal 44. The digital signal is introduced to the memory means 32 which provides a pair of signal outputs; viz, the drive signal from the D/A converter 34, and the reference signal from the D/A converter 36. As previously noted the drive signal is unloaded from the memory means 32 at a programmable rate, and is used to drive the vibrator 14 (FIG. 1). The reference signal is unloaded at a constant rate relative to the input load rate of the memory means 32, but is displaced in time by a selected amount of the total memory locations. In this particular application, by way of example only, the reference signal is delayed 128 milliseconds, which is one-half the memory locations of the particular buffer memory means 32 employed herein. Thus the reference signal represents the analog input signal introduced to terminal 44 and is a fixed reference. If there is no phase shift in the vibrator output signal, no error is sensed by the phase detector 26 and the vibrator displacement and output signal is in phase with the analog input signal.

Accordingly, the phase detector 26 provides two functions; first, it senses the lead or lag of the error signal from terminal 42 relative to the reference signal introduced thereto by the D/A converter 36, and second, it delivers a signal representative of the phase error detected in terms of time, i.e., delivers a series of pulses having a width which is proportional to the phase error. The phase error output is delivered to a DC integrator 46, which generates a DC voltage (in the form of a ramp) which is proportional to the phase error, that is, provides a DC signal whose level is proportional to the magnitude of the phase error. The output from the DC integrator 46 is introduced to a DC amplifier 48 wherein the signal is amplified and fed to a level detector circuit 50.

The level detector circuit 50 senses the level of the DC signal generated by the DC integrator 46 and amplified by the amplifier 48. More particularly, the level detector 50 detects the level of the voltage at 3 increments along the ramp; a first level A is set at a slight increase from zero (e.g. 5 percent change in frequency of the error signal). A second level B is set at the mid level (20 percent change in frequency). A third level C is set at a maximum level (50 percent change in frequency). Thus level A provides for a phase error correction rate of 5 percent; the level B, a correction rate of 20 percent; and level C a correction rate of 50 percent. The level detector circuit 50 thus provides an output signal on one of three output lines representative of one of the three levels of the ramp generated by the DC integrator 46, which output is introduced to a matrix gates circuit 52.

As previously noted the phase detector means 26 also provides a signal therefrom which is indicative of the lead or lag of the vibrator output phase relative to the reference signal phase. This lead/lag sense signal is a pulse signal similar to the error signal from the phase detector means 26, and provides a low or high level via a switch means (not shown) which is turned on or off. This lead/lag sense signal is also delivered to the matrix gates circuit 52, as further described below.

The phase error signal from the phase detector means 26 is also delivered as the error up-count enable signal to an error count and register unit 54. An up clock signal is also introduced to the unit 54 and clocks the latter at the basic sample rate of the memory means 32. Thus the error up count enable signal enables the error count and register unit 54 to count for the duration of the phase error, i.e., count up until the error pulse ends. The counts are stored in a register portion of the unit 54, and are equal to the count time of memory locations in units of memory samples or locations. The units are established by the up clock counts which are derived from the same source which clocks the memory means load counter, described infra. (The sample rate of the memory means 32 is defined as the time it takes to move one location to the next location, and is a constant in servo 10.)

Regarding further the function of the error count and register unit 54, the phase detector means 26 senses the phase difference between the error signal and the reference signal only during the crossover points, i.e., the phase is checked every 180°. Accordingly, error information would only be available during the time interval that the error is being detected by phase detector 26, or every 180°. However, since the unit 54 counts the error in terms of memory locations, and stores the information, it provides the error count over the entire cycle interval. Phase error correction accordingly can be made over the entire interval, rather than only during the error signal duration.

As previously noted the matrix gates circuit 52 receives two inputs, the lead/lag sense signal from the phase detector 26 and one of the three level signals from the level detector circuit 50. If the phase error of the vibrator output is leading the condition is indicated by the lead/lag sense signal. The matrix gates circuit 52 enables certain gates therein in response to the level signal and the lead/lag sense signal, to provide an output on one of seven outputs which is indictive not only of the phase error sense (lead or lag), but also of the DC voltage level detected by the level detector circuit 50. The latter determines the phase error rate of correction established by the digital servo.

The matrix gates circuit 52 is coupled to a memory program matrix 56 via a plurality of output lines (7 in this example), and to a register program matrix 58 via a plurality of output lines (3 in this example). The latter matrix 58 provides a program output to a variable correction rate counter 60, which in turn is coupled to the error count and register unit 54 via a down clock signal. The memory program matrix 56 provides a program output to a variable sample rate counter 62 which in turn is coupled to a drive signal unload counter 64. A basic sample rate counter 66 is connected to a memory load counter 68 and to a reference signal unload counter 70. A clock signal is introduced to the variable sample rate counter 62 and to the basic sample rate counter 66 via a terminal 72. The count from the variable sample rate counter 62 is supplied as a clock to the variable correction rate counter 60, while the count from the basic sample rate counter 66 is introduced as the up clock signal to the error count and register unit 54, as previously described.

The counters 64, 68 and 70 provide outputs to an address gates unit 74, which in turn provides the clock signals to the memory means 32. The signal from the reference signal unload counter 70 is used to unload the memory means 32 and generate the reference signal, while the drive signal unload counter 64 unloads the memory means 32 to generate the drive signal for the vibrator 14.

Accordingly, the memory program matrix 56 provides four basic programs for programming the variable sample rate counter 62. One is a basic program which provides a basic count rate when there is zero phase error in the vibrator output. The basic program is fed to the variable sample rate counter 62 to clock same at the basic count rate as that of the basic sample rate counter 66. Three other programs increase the count rate of the variable counter 62 by the correction rate percentage determined by the levels generated by the level detector 50. The three remaining programs decrease the count rate of the variable counter 62 by a similar plurality of correction rate percentages as the three increase programs. Thus the memory program matrix 56 provides an output which determines the rate at which the variable counter 62 counts. Whether the counter 62 counts faster or slower than the basic sample rate counter 66 is determined by the lead/lag sense signal delivered to the matrix gate circuit 52.

The register program matrix 58 comprises a program matrix circuit similar to that of matrix 56, and provides a plurality of programs (three in this example) one of which is fed to the variable correction rate counter 60. The particular program output is determined by the correction rate percentage which the level detector circuit 50 and matrix gates circuit 52 are correcting the phase error. Thus the register program matrix 58, in conjunction with the clock fed from the variable counter 62, provides means for determining how many counts of the clock are counted before the variable correction rate counter 60 generates a down clock signal, which in turn is fed to the error count and register unit 54 to count down one error count previously stored therein. Thus the number of counts of the clock before a down clock signal is fed to the unit 54, is determined by the particular program fed to the variable correction rate counter 60 in response to the corresponding correction rate level selected by the matrix gate circuit 52 in the register program matrix 58.

Accordingly, the memory and register matrix 56, 58 provide essentially the same function, e.g., matrix 56 provides a change in the counter 62 count rate, while the register program matrix 58 provides a change in the rate that the error counts are counted down in the error count and register unit 54.

The count rate introduced from the variable counter 62 to the drive signal unload counter 64 is either increased or decreased to increase or decrease correspondingly the speed with which the memory unloads the drive signal being introduced to the vibrator 14. Accordingly, the speed of the vibrator 14 is increased or decreased to compensate for any phase differences detected by the phase detector 26.

The phase error correction process continues until the error count and register unit 54 counts down to zero, whereupon a zero state clamp signal is sent to the DC integrator to clamp the integrator to a selected DC level. The level detector 50 in turn directs the matrix gates circuit 52 to introduce the basic program to the variable counter 62. The counter 62 counts at the same rate as the basic counter 66, indicating no phase error in the vibrator 14 output.

The invention further contemplates the provision of a counter preset means 76 coupled to the drive signal unload counter 64. The procedure for setting the counter preset means 76 includes generating and displaying the phase error, in terms of memory locations or samples, in the error count and register unit 54. Thus the maximum error at the beginning of a test sweep survey conducted for just such purpose, as indicated by the register, is noted by the operator. The servo 10 is preset for minimum initial phase shift by presetting the drive signal unload counter 64 the indicated number of locations via the counter preset means 76. Switch means is included for setting the lead or lag of the phase error whereby the servo drive signal and thus the vibrator is started in phase. The counter preset means 76 is further described infra in FIG. 6.

It is noted that the circuit of FIG. 2 provides a rather sophisticated servo which includes a plurality of programs for tailoring the correction rate to the magnitude of the phase error. That is, the counting rate of the variable sample rate counter 62 is variable through a plurality of correction rate steps, as is the variable correction rate counter 60. However, it is to be understood that the invention combination contemplates various alternative, less sophisticated but equally practical servos. For example, in a first alternative, the level detector circuit 50 may be omitted and the DC integrator 46 serves as a charging capacitor device, wherein correction is provided via the matrix gates circuit 52 and the program matrixes 56, 58 as the capacitance discharges. In a further embodiment three programs are provided via the memory program matrix 56; a basic program, a lead program, and a lag program. The latter two programs direct the variable sample rate counter 62 up or down respectively at a constant rate. In the latter embodiment there is no need for the error count and register unit 54 or for the DC integrator 46. This latter embodiment corrects for phase error only during the presence of the error and provides the functions of the type of servo known in the servo art as a pure "null-seeking servo."

Referring now to FIGS. 3–6 there is shown in greater detail the logic schematic for the various circuits of FIG. 2, by way of exemplifying a preferred implementation of the invention.

Figure 3:
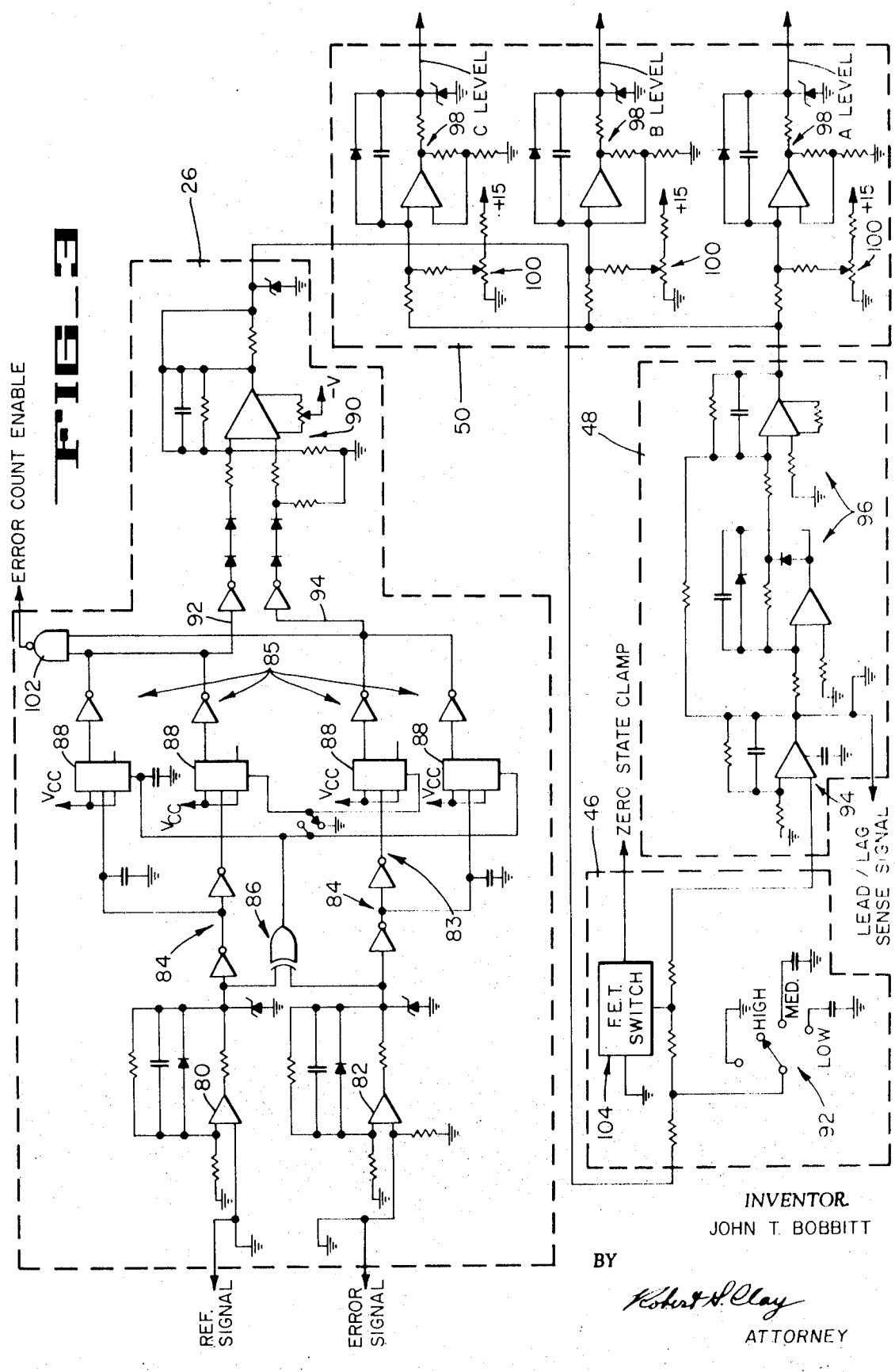
Figure 4:
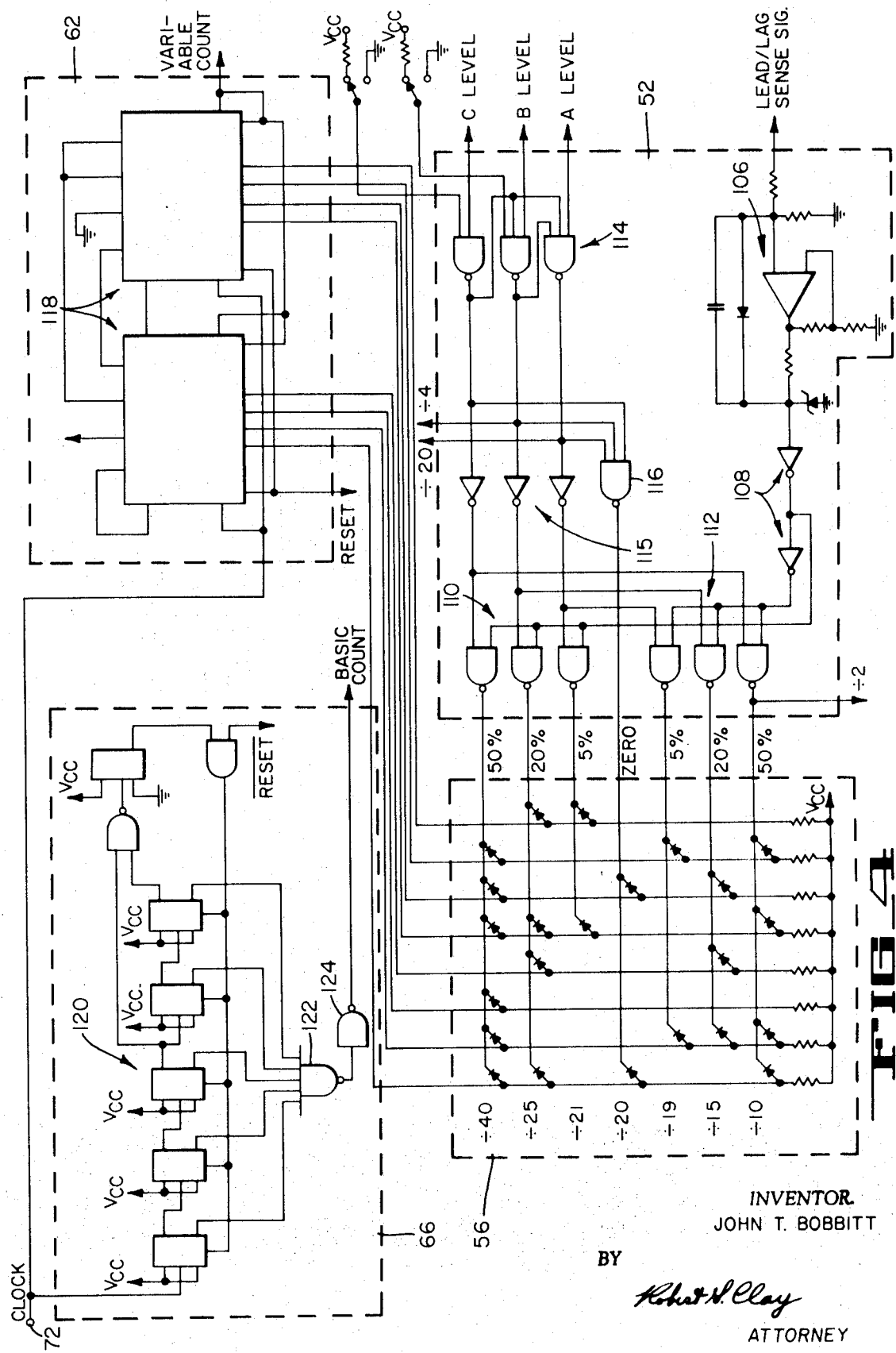

Accordingly, referring first to FIG. 3 in conjunction with FIGS. 4–6, there is shown the phase detector 26, including the reference signal input and the error signal input of previous mention. Each of the signals are fed to respective amplifiers 80, 82 which provide similar square wave outputs commensurate with the respective reference and error signal inputs. The square wave outputs, including any phase error which may exist, are introduced to a phase detector circuit 83 formed generally of an exclusive OR gate 86, inverters 84, 85 and a plurality of flip-flops 88. The output from the phase detector 83 consists of two signals of the same polarity which are indicative of the lead or lag of the error signal relative to the phase of the reference signal. The lead and lag signals are introduced via lines 94, 92 respectively, to a differential amplifier 90 as a high and low signal of the same polarity. The differential amplifier converts the high and low signals to a positive or negative output signal respectively, which is indicative of whether the phase error is leading or lagging the reference signal. Thus when "lag" line 92 is high, the differential amplifier generates a negative polarity output indicative of a lagging phase error, whereas when the lead line 94 is low the differential amplifier provides a positive polarity output indicative of a leading phase error.

The output from the phase detector means 26 is fed to the DC integrator 46, which includes a mechanically operable switches 92 having different positions whereby capacitors of different values may be inserted in the circuit. The "high" position of the switch 92 provides no capacitance and the output of the amplifier is fed into the DC amplifier 48. The "medium" and "low" settings of the switch 92 insert a small and large capacitance, respectively, into the circuit to provide a selectable slope on the voltage ramp generated, and thus a different charge rate at which the subsequent threshold detector will be turned on.

The output from the DC integrator 46 is introduced to a DC amplifier 94 which increases the gain of the circuit to thus control the sensitivity of the loop. A rectifier circuit 96 receives the amplified signal and converts it to a signal having negative values only. Accordingly, the signal delivered to the level detector circuit 50 is polarity independent, and the circuit 50 need detect only the magnitude of the voltage level, not the polarity. Accordingly, the level detector circuit 50 provides a plurality of comparators 98 which act as switches. Reference level setting means 100 are provided at each comparator 98 input whereby a series of reference levels or voltage thresholds are set. Thus an increasing voltage signal delivered by the DC amplifier 48 will successively turn on the comparators 98 as the increasing voltage matches the increasingly higher voltage threshold levels set by the level setting means 100. Level A accordingly delivers an output corresponding to a 5 percent phase error correction rate, level B a 25 percent correction rate, and level C a 50 percent correction rate.

The lead and lag lines 94, 92 respectively are also fed to an OR gate 102 which provides an output therefrom when either the lead or the lag signal exists on lines 94, 92. The output from the OR gate 102 is the error up count enable signal which is delivered to the error count and register unit 54 of previous mention (shown in greater detail in FIG. 5).

The lead/lag sense signal is generated in the DC amplifier 48, e.g., amplifier 94, and, as previously described, is a logic signal consisting of either a high or a low, where high indicates a leading phase error and low indicates a lagging phase error relative to the reference signal. The lead/lag sense signal is delivered to the matrix gates circuit 52 shown in further detail in FIG. 4 infra.

The zero state clamp signal previously mentioned with reference to the error count and register unit 54, and further shown in FIG. 5 infra, is introduced to the DC integrator 46 (FIG. 3), and particularly to a switching means which includes a field effect transistor switch means 104. The switch means 104 is coupled to the circuit after the switch 92 of the DC integrator 46. As previously described, at such time as the error count and register unit 54 is counted down to zero it generates an output consisting of the zero state clamp. The clamp signal is fed to the field effect transistor switch means 104, whereby the error signal being delivered from the phase detector 26 is clamped to ground. This results in the level detector circuit 50 providing the basic program to the variable sample rate counter 62 via the matrix gates circuit 52 and memory program matrix 56 indicating a zero phase error in the vibrator 14 output.

Referring particularly to FIG. 4 in conjunction with FIGS. 3, 5 and 6, there is shown the matrix gates circuit 52, the memory program matrix 56, the variable sample rate counter 62, and basic sample rate counter 66 previously discussed in FIG. 2. The voltage levels A, B, C generated by the level detector 50 of FIG. 3 are introduced to the matrix gates circuit 52 along with the lead/lag sense signal. Note the latter signal is shown in FIG. 2 as originating in the phase detector 26 for clarity in the block diagram description, but in actuality is generated via the DC amplifier 48 as shown in the detailed schematic of FIG. 3.

The lead/lag sense signal is delivered to a high gain operational amplifier 106 which acts as a rather sensitive switch. That is, any small input triggers the operational amplifier 106 on. Thus a high lead/lag sense signal provides an output of one polarity whereas a low lead/lag sense signal provides an output from the amplifier 106 of the opposite polarity. The signals are fed to inverter means 108 which in turn provide selection of either a "lead" or "lag" AND-gate means 110, 112 respectively. The gates 110, 112 provide a decrease or an increase respectively of the count delivered by a counter 118 of the variable sample rate counter 62 (via the memory program matrix 56) as determined by the leading or lagging phase error respectively.

The correction rate is determined by the levels A, B and C which are introduced to respective AND-gates 114 which, in turn, are coupled via inverters 115 to the lead and lag AND-gate means 110, 112 respectively. As shown, the outputs from the lead and lag gate means 110, 112 are defined in terms of percent rate of correction of the phase error; that is, they select a program from the memory program matrix 56 which is shown in FIG. 4 at the matrix gates circuit 52 outputs as, 50, 20 and 5 percent decrease in the variable sample rate counter 62 counting rate, or, 5, 20 and 50 percent increase in the counting rate. Note the zero output from the matrix gates circuit 52 is provided via an AND-gate 116, coupled at its input to all three outputs of AND-gates 114, and which provides a basic program to the variable sample rate counter 62. The basic program clocks the counter 62 at the same count rate as that of the basic sample rate counter 66, indicating no phase error in the vibrator output.

Accordingly, as shown in FIG. 4 the memory program matrix 56 comprises seven programs, selectable by the matrix gates circuit 52 outputs, depending upon the magnitude of the phase error and whether it is leading or lagging the phase of the reference signal. To this end, the memory program matrix 56 provides a 20 program for the zero phase error or basic program, a 21 program which provides a 5 percent decrease in the rate count, a 25 program for providing a 20 percent decrease in the rate count, and a 40 program for a 50 percent decrease in counting rate of the variable sample rate counter 62. Thus for each of the latter three programs the output of the counter 118 is correspondingly slowed to provide the chosen count rate change to the drive signal unload counter 64. Likewise if the phase error is lagging, the "lead" gate means 112 provide a 19 program for a 5 percent faster count rate to the variable sample rate counter 62, a 15 program for a 20 percent increase, and a 10 for a 50 percent increase in the rate of correction of the phase error.

As shown in FIG. 4, the main clock signal of FIG. 2, is fed via terminal 72 to the counters 118. The main clock is also fed from terminal 72 to the series of flip-flops 120 which comprise the basic sample rate counter 66. The "basic count" signal shown in FIG. 2 as the counter 66 output, is provided via the AND-gate 122, and the AND-gate 124 wherein the latter acts as an inverter. The basic count output of the counter 66 is fed to the memory load counter 68 and provides for loading the memory, and unloading the reference signal from the memory, at a constant rate. It is to be understood that the "-main" clock is a relatively wide pulse, as are the basic count and the variable count signals from the basic and variable sample rate counters 66 and 62 respectively. Additional, higher frequency clocks are provided in a manner commonly known in the art, to provide additional functions of component timing such as, for example, when addressing the memory means 32, the A/D and D/A converters 30, 34, 36, the address gates 74, etc.

The output from the matrix gates circuit 52 comprises three output signals corresponding to a 5, 20 and 50 percent change in the correction rate, and are herein shown as outputs 20, 4 and 2 respectively. These outputs are fed to the register program matrix 58.

Referring now to FIG. 5, along with FIGS. 3, 4 and 6, the error count and register unit 54 is coupled to the variable correction rate counter 60 and the register program matrix 58.

The error up count enable signal introduced from the phase detector 26, and more particularly the OR-gate 102 thereof, is introduced to an AND-gate 126 which also receives an up clock signal from the basic sample rate counter 66; i.e., the up clock input to the error count and register unit 54 is the basic count output of the counter 66. Accordingly, when a phase error is present a lead or a lag signal is introduced to the AND-gate 126 via the OR-gate 102 to enable the former gate. This in turn allows the up clock pulses to pass through the AND-gate 126 to clock a register 128 up only during the period of time that the error signal is present. Thus as previously described with reference to FIG. 2, the register is counted a number of counts equal to the duration of the error pulses delivered by the phase detector 26. That is, the counts in the register 128 are equal to the count time of the memory locations in units of memory samples. An AND-gate 130 is coupled to the register 128 locations, whereupon filling the register enables the AND-gate 130 to supply a disabling input to the AND-gate 126. Accordingly, a low level from AND-gate 130 prevents further counts from entering the register 128 via the AND-gate 126, thereby preventing loss of the counts in the register.

As discussed in FIG. 2, the register 128 is counted back down during the phase error correction process at a rate selected by the matrix gates circuit 52 in response to the level detector circuit 50, and as programmed by the register program matrix 58. As may be seen from FIG. 5, the matrix 58 provides a 2, a 4, and a 20 program one of which is selected to determine the rate at which the down clock signal is introduced from a counter 132 to the register 128 via an AND-gate 134. The counter 132 is clocked by the basic count introduced from the basic sample rate counter 66 (FIG. 2), via a gate 135, and a count down enable pulse delivered to the gate 135 and a gate 134. Thus the rate at which the register 128 is down clocked is controlled by the matrix program selected by the matrix gates circuit 52 output, which rate is determined by the particular level at which the level detector circuit 50 is operating. The AND-gate 134 is always enabled to clock down the register 128 as the phase error is being corrected.

A flip-flop 138 is provided and is coupled to the register 128 via an output line 139, and provides means for keeping one count in the circuit to allow starting the down clock procedure after the register 128 has down clocked to zero. The flip-flop 138 is coupled as one input to the AND-gate 134.

A plurality of gates 140 provide means for sensing when the register 128 counts down to zero. At such time they output through an inverter 142 to provide the zero state clamp signal of previous description in FIGS. 2 and 3. The zero state clamp from the gates 140 clears the flip-flop 138. The reset signal into the register 128 is an initial or master reset for the system as is conventionally employed in logic systems. This is true of all the reset and reset signals of the servo 10.

A preset test sweep circuit 144 is coupled to the AND-gate 126. This circuit is associated with the counter preset means 76 coupled to the drive signal unload counter 64 and previously described with reference to FIG. 2. That is, the preset test sweep circuit 144 provides the phase error in counts during a test sweep survey, which counts are used to set the counter preset means 76 as further described with reference to FIG. 6. Accordingly, the preset test sweep circuit provides logic which looks at the error counts generated by the phase error during the test survey, and then enables the AND gate 126 to display the error counts in the register 128. The values displayed then can be employed to preset the counter preset means 76 (FIG. 6). Thus at the start of a seismic survey the vibrator is operated in phase with the analog input signal.

Referring now to FIG. 6, there is shown the memory load, the reference signal unload, the the drive signal unload counters 68, 70 and 64 respectively, along with the address gates unit 74 and the counter preset means 76. The counters and address gates are generally conventional and are shown in logic schematic in FIG. 6 by way of illustrating their arrangement in addressing the buffer memory means 32. A portion of the address gates unit 74 is shown with a respective counter, whereby the outputs from the gates are coupled together and fed to the memory means 32. Means (not shown) are contemplated in the conventional manner for varying the capacity of the memory, as well as for comparing the memory load counter 68 and the reference unload counter 70 to provide synchronization therebetween. The basic count is delivered from the basic sample rate counter 66 to both the memory load counter 68 and the reference signal unload counter 70, at a constant rate, to load the memory means and unload the reference signal with the preselected delay previously mentioned with reference to FIG. 2. The variable count from the variable sample rate counter 62 is introduced to the drive signal unload counter 64, and additional higher frequency pulses are introduced as at 146, 148 to enable the respective series of gates of the address gates unit 74, such signals comprising a drive address enable signal and a reference address enable signal respectively. In addition, a load address enable signal of a higher frequency clock is delivered to 150 to enable the respective series of gates of the address gates unit 74 associated with the memory load counter 68. These higher frequency clocks clock the gates unit during the presence of the basic count clocks as is conventionally done in memory address logic.

The memory load counter 68 includes a series of flip-flops 152 as shown in FIG. 6 which are employed to vary the capacity of the memory as previously mentioned. In addition various reset, and reset signals are introduced to the various counters as conventionally done to clear the counters in preparation for cycling during a subsequent record.

Referring now to the counter preset means 76, the variable count signal is introduced thereto via an inverter 154, flip-flop 156 and an AND-gate 158. The output from the AND-gate 158 is delivered via an inverter 160 to the counter 162. A series of AND-gates 164 are provided for input of the preset information via a plurality of thumbwheels (not shown) which are set in accordance with the results obtained from the test sweep survey previously described with reference to FIG. 5. That is, the expected phase errors displayed on the register 128 of the error count and register unit 54, during the test sweep survey, are set on the individual thumbwheels. The latter provide inputs to the counter 162 via the AND-gates 164. The lead or lag information is entered by the operator on the switch means 166, which enables the corresponding one of a pair of AND-gates 168. Accordingly, in operation, the counter 162 is clocked via the variable count signal and a higher frequency clock at 170, until the counter 162 is filled in accordance with the input set by the thumbwheels. Simultaneously with filling the counter 162 with the preselected number of counts, the counts are fed via the respective AND-gate 168 as enabled by the lead/lag switch 166, to place the counts in the drive signal unload counter 64. At such time as the counter 162 is filled with the prescribed number of counts, outputs therefrom are introduced to an AND-gate 172 which outputs to the AND-gate 158 and disables the latter. Thus, the drive signal unload counter 64 is filled with the prescribed number of counts, whereupon during a subsequent survey operation the vibrator 14 is driven in phase with the analog input signal. That is, when the actual survey is started, the preset drive signal unload counter 64 is already advanced forward or back to the number of counts corresponding to the phase shift error previously obtained via the preset test sweep circuit 144 during the test sweep survey.

What is claimed is:
1. A digital phase correcting servo for controlling the phase of a driven apparatus relative to the phase of an input signal, comprising the combination of:
   digital memory means coupled to the input signal and the driven apparatus for generating a drive signal for introduction to the driven apparatus;
   said digital memory means including means for providing a reference signal which is fixed phase relation, and displaced by a selected time, relative to the input signal:
   means coupled to the driven apparatus for detecting any phase difference between the driven apparatus output and the reference signal, and for generating an error signal indicative of the phase difference: and
   logic means coupled to the means for detecting and to the digital memory means for moving the drive signal introduced to the driven apparatus a time rate of change commensurate with the detected phase difference.
2. The digital phase correcting servo of claim 1 wherein the logic means directs the digital memory means to move the drive signal introduced to the driven apparatus a number of samples equal to the units of sample rate time corresponding to the detected phase difference, to provide the driven apparatus output with zero phase difference relative to the reference signal.

3. The digital phase correcting servo of claim 2 wherein the logic means is adapted to unload the digital memory means at a programmable rate to generate the corrected drive signal.

4. The digital phase correcting servo of claim 3 wherein the means for generating a reference signal includes digital to analog converter means coupled to the digital memory means, said reference signal being unloaded from the digital memory means in response to the logic means at a constant rate relative to the input signal and displaced in time therefrom on the order of one-half the total memory means locations.

5. The digital phase correcting servo of claim 4 wherein the digital memory means includes an analog to digital converter means coupled to the input signal, a digital memory coupled to the analog to digital converter means, a drive and a reference digital to analog converter coupled to the digital memory, said converters being coupled to the driven apparatus and to the means for detecting the phase difference respectively.

6. The digital phase correcting servo of claim 5 wherein means for detecting comprises phase detector means adapted to generate said error signal indicative of the phase difference and of the direction of phase error in terms of lead or lag;
   said logic means further including program generating means operatively coupled to the error signal;
   said digital memory means being responsive to the program generating means to move the drive signal the detected number of samples therein in the direction commensurate with the direction of phase error.

7. The digital phase correcting servo of claim 6 wherein the logic means further includes;
   an error count and register means operatively coupled to the phase detector means and adapted to count up and store a number of counts corresponding to the duration of the phase error signal in units of digital memory locations;
   wherein said program generating means includes at least one program corresponding to the magnitude of the phase difference and direction of phase shift, said logic means including means for selectively addressing the digital memory means in response to the program to direct the movement of the drive signal within the memory means.

8. The digital phase correcting servo of claim 7 wherein the logic means further includes;
   integrator and level detector means coupled to the phase detector means for generating at least one voltage level indicative of the magnitude of the phase difference;
   wherein said program generating means includes matrix gate means adapted to select a program in responsive to the voltage level; and
   counter means coupled to the program generating means and responsive to the program to clock the digital memory means and move the drive signal the number of samples corresponding to the phase difference.

9. The digital phase correcting servo of claim 8 wherein the logic means further includes counter presetting means coupled to said counter means for presetting the count of the counter means in accordance with the magnitude and direction of phase difference, wherein upon operation of said driven apparatus the drive signal is introduced from the digital memory means in phase with the input signal.

* * * * *